United States Patent
Jeon et al.

(10) Patent No.: US 10,997,529 B2
(45) Date of Patent: May 4, 2021

(54) MOBILE DEVICE AND CONTROL METHOD THEREFOR

(71) Applicant: LG ELECTRONICS INC., Seoul (KR)

(72) Inventors: Yongwook Jeon, Seoul (KR); Sungho Myoung, Seoul (KR)

(*) Notice: Subject to any disclaimer, the term of this patent is extended or adjusted under 35 U.S.C. 154(b) by 416 days.

(21) Appl. No.: 15/742,748

(22) PCT Filed: Jul. 9, 2015

(86) PCT No.: PCT/KR2015/007148
§ 371 (c)(1),
(2) Date: Jan. 8, 2018

(87) PCT Pub. No.: WO2017/007050
PCT Pub. Date: Jan. 12, 2017

(65) Prior Publication Data
US 2018/0197117 A1    Jul. 12, 2018

(30) Foreign Application Priority Data
Jul. 9, 2015    (KR) .................. 10-2015-0097782

(51) Int. Cl.
*G06Q 10/02* (2012.01)
*H04M 1/72403* (2021.01)
(Continued)

(52) U.S. Cl.
CPC ........ *G06Q 10/02* (2013.01); *H04M 1/72403* (2021.01); *H04M 1/72436* (2021.01); *H04M 1/72451* (2021.01); *H04M 1/72457* (2021.01)

(58) Field of Classification Search
CPC ............. G06Q 10/02; H04M 1/72522; H04M 1/72552; H04M 1/72566; H04M 1/72572
See application file for complete search history.

(56) References Cited

U.S. PATENT DOCUMENTS

| | | | | |
|---|---|---|---|---|
| 2009/0138599 A1* | 5/2009 | Allin | .................. | H04L 12/5692 709/226 |
| 2010/0235201 A1* | 9/2010 | McEvoy | ................ | G06Q 10/02 705/5 |

(Continued)

FOREIGN PATENT DOCUMENTS

| | | |
|---|---|---|
| JP | 2013-246086 A | 12/2013 |
| KR | 10-2010-0013924 A | 2/2010 |

(Continued)

OTHER PUBLICATIONS

Marsá-Maestre et al., Mobile Devices for Personal Smart Spaces, 21st International Conference on Advanced Information Networking and Applications Workshops (AINAW'07) (Year: 2007).*

*Primary Examiner* — Rupangini Singh
(74) *Attorney, Agent, or Firm* — Birch, Stewart, Kolasch & Birch, LLP

(57) ABSTRACT

The present invention relates to a mobile device and a control method therefor. A mobile device according to an embodiment of the present invention comprises: a memory which stores a first application and a second application; a user interface module which receives specific time information and specific location information according to the first application stored in the memory; a display module which displays a schedule including the received specific time information and specific location information; and a controller which controls the memory, the user interface module, and the display module, wherein the controller performs control so as to execute the second application stored in the memory, receive additional information on the specific location according to the executed second application, and change the schedule on the basis of the received additional information.

10 Claims, 17 Drawing Sheets

(51) Int. Cl.
*H04M 1/72436* (2021.01)
*H04M 1/72451* (2021.01)
*H04M 1/72457* (2021.01)

(56) References Cited

U.S. PATENT DOCUMENTS

| | | | |
|---|---|---|---|
| 2013/0262599 A1* | 10/2013 | Lee | H04M 1/72547 |
| | | | 709/206 |
| 2013/0308764 A1* | 11/2013 | Abuelsaad | H04M 3/567 |
| | | | 379/93.01 |
| 2014/0136213 A1* | 5/2014 | Kim | G06F 3/167 |
| | | | 704/275 |
| 2014/0188539 A1 | 7/2014 | Choi et al. | |
| 2014/0288832 A1* | 9/2014 | Hoch | B60L 3/12 |
| | | | 701/538 |
| 2015/0135088 A1* | 5/2015 | Lim | G06Q 10/1093 |
| | | | 715/745 |
| 2015/0193379 A1* | 7/2015 | Mehta | G10L 15/00 |
| | | | 704/9 |

FOREIGN PATENT DOCUMENTS

| | | |
|---|---|---|
| KR | 10-2012-0093614 A | 8/2012 |
| KR | 10-2013-0139782 A | 12/2013 |

\* cited by examiner

FIG. 18

| name | telephone number | ID | |
|---|---|---|---|
| matgaltang | 02-555-5555 | #1 | —1810 |
| matnangalbi | 02-555-5555 | #1 | —1820 |
| matgalbi | 02-555-5555 | #1 | —1830 |
| galbitang | 031-111-1111 | #2 | —1840 |
| ⋮ | ⋮ | ⋮ | |

MOBILE DEVICE AND CONTROL METHOD THEREFOR

CROSS REFERENCE TO RELATED APPLICATIONS

This application is the National Phase of PCT International Application No. PCT/KR2015/007148, filed on Jul. 9, 2015, which claims priority under 35 U.S.C. 119(a) to Patent Application No. 10-2015-0097782, filed in Republic of Korea on Jul. 9, 2015, all of which are hereby expressly incorporated by reference into the present application.

TECHNICAL FIELD

The present invention relates to a mobile device and a method of controlling therefor. For example, the present invention relates to a technology for automatically changing content of a calendar mounted on a mobile device by automatically sensing a need (requirement) of a user. More specifically, the present invention can be applied to a mobile device in which an IA (intelligent agent) system is installed.

BACKGROUND ART

A mobile device can install a specific essential application in the mobile device in an embedded form or download various applications in a memory. Recently, a user of the mobile device frequently uses a "calendar"-related application capable of easily managing a schedule. As mentioned in the foregoing description, the calendar-related application can also be stored in the memory at the time of manufacturing the mobile device or is designed to be downloaded or deleted to/from the memory according to the necessity of a user.

Yet, a schedule-related application or a calendar-related application according to a legacy technology has a problem that the application provides a user with a function based on information directly inputted by the user only. Although the present specification mainly explains a schedule-related application or a calendar-related application applied to a mobile device, the present invention can also be applied to a tablet PC, a laptop, a TV, or other display device rather than the mobile device.

DISCLOSURE OF THE INVENTION

Technical Tasks

An embodiment of the present invention is to provide a mobile device automatically checking whether or not it is able to reserve a specific location based on basic information (e.g., including at least one of specific time information and specific location information).

When it is technically impossible to check whether or not it is able to make a reservation via Internet, database (DB), and the like, another embodiment of the present invention is to provide a solution and define a specific method of generating an ARS message necessary for automatically checking whether or not it is able to make a reservation.

Another embodiment of the present invention is to define a method of performing communication between an IA (intelligent agent) mounted on a mobile device of a normal user and an IA mounted on a mobile device of a store owner.

Another embodiment of the present invention is to provide a solution for mapping information on specific locations frequently used by a user into one.

The other embodiment of the present invention, unlike the abovementioned embodiments, is to provide a technology of automatically recommending specific location information optimized to a user before the user uses a calendar stored in a mobile device.

Technical Solution

To achieve these and other advantages and in accordance with the purpose of the present invention, as embodied and broadly described, according to one embodiment, a method of controlling a mobile device includes the steps of executing a first application stored in a memory, receiving specific time information and specific location information according to the executed first application, storing a schedule including the received specific time information and the specific location information in the memory, displaying the schedule, executing a second application stored in the memory, and receiving additional information on the specific location according to the executed second application and controlling the schedule to be changed based on the received additional information.

To further achieve these and other advantages and in accordance with the purpose of the present invention, according to a different embodiment, a mobile device includes a memory configured to store a first application and a second application, a user interface module configured to receive specific time information and specific location information according to the first application stored in the memory, a display module configured to display a schedule including the received specific time information and the specific location information, and a controller configured to control the memory, the user interface module, and the display module, the controller configured to execute a second application stored in the memory, the controller configured to receive additional information on the specific location according to the executed second application and control the schedule to be changed based on the received additional information.

Advantageous Effects

According to one embodiment of the present invention, it is able to update contents related to a schedule or a calendar based on even information not inputted by a user using an IA (intelligent agent), and the like. More specifically, it is able to provide a mobile device automatically checking whether or not it is able to reserve a specific location based on basic information (e.g., including at least one of specific time information and specific location information).

According to another embodiment of the present invention, when it is technically impossible to check whether or not it is able to make a reservation via Internet, database (DB), and the like, it is able to check whether or not it is able to make a reservation by automatically executing a normal phone or an ARS phone.

According to the other embodiment of the present invention, it is able to define a method of performing communication between an IA (intelligent agent) mounted on a mobile device of a normal user and an IA mounted on a mobile device of a store owner, provide a solution for mapping information on specific locations frequently used by a user into one, and provide a technology of automatically recommending specific location information optimized to a user before the user uses a calendar stored in a mobile device.

DESCRIPTION OF DRAWINGS

FIG. 18 is a diagram for explaining a method for a mobile device to manage a plurality of locations with a single ID by utilizing a database according to a further different embodiment;

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
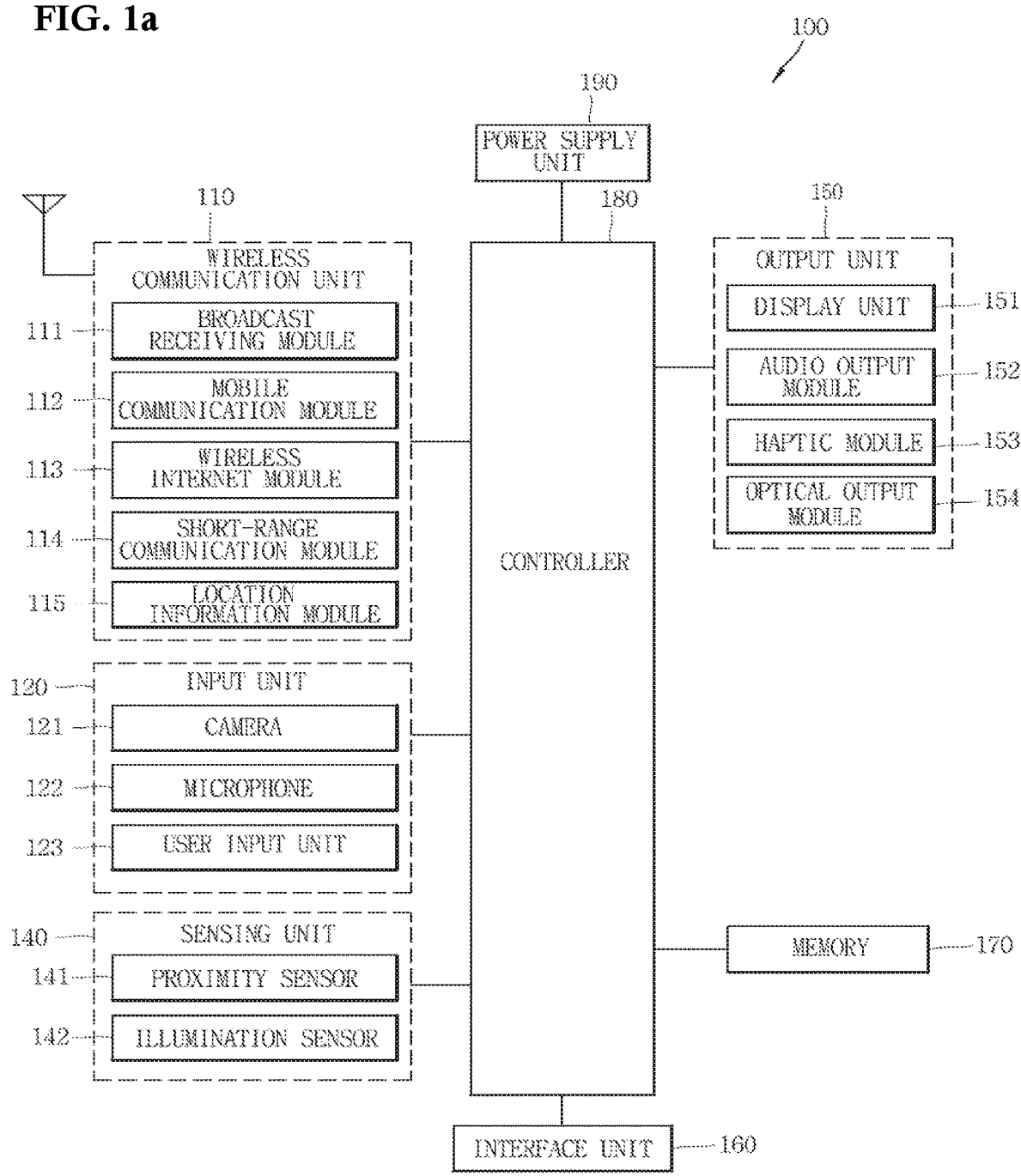
FIG. 1A is a block diagram of a mobile terminal in accordance with the present disclosure.
Figure 1B:
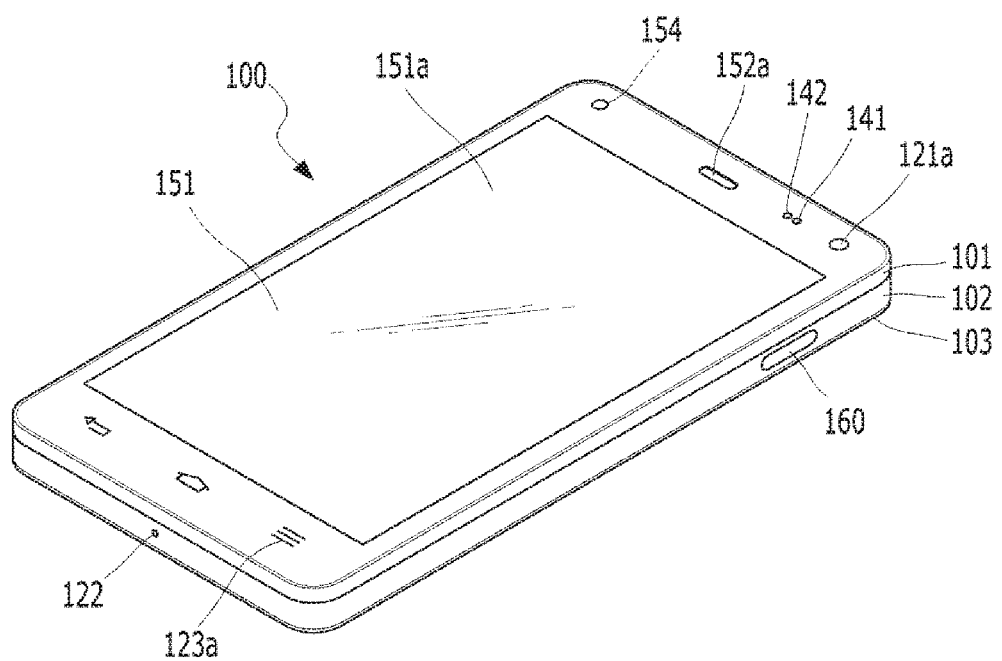
FIGS. 1B and 1C are conceptual views of one example of the mobile terminal, viewed from different directions.
Figure 1C:
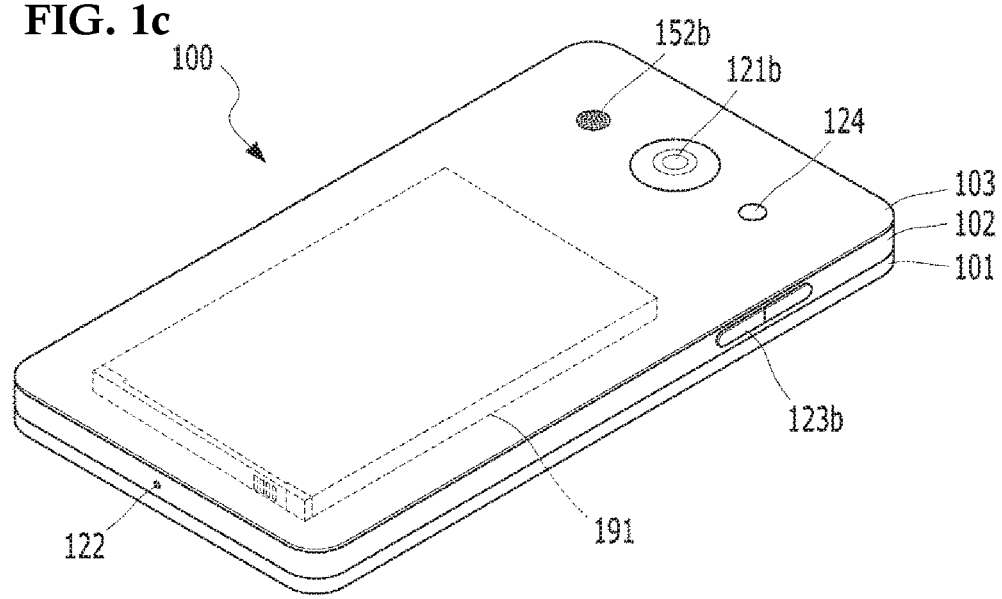

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
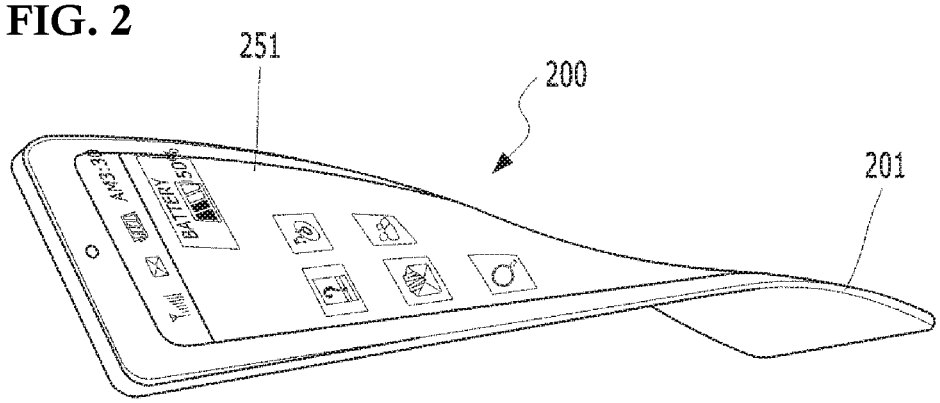
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
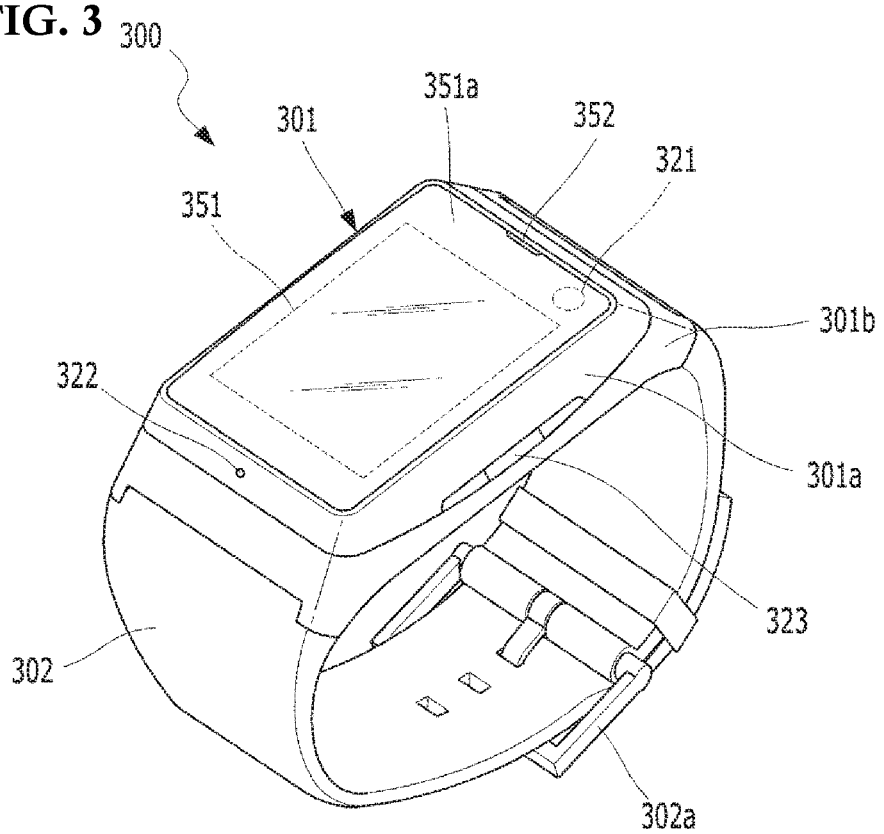
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
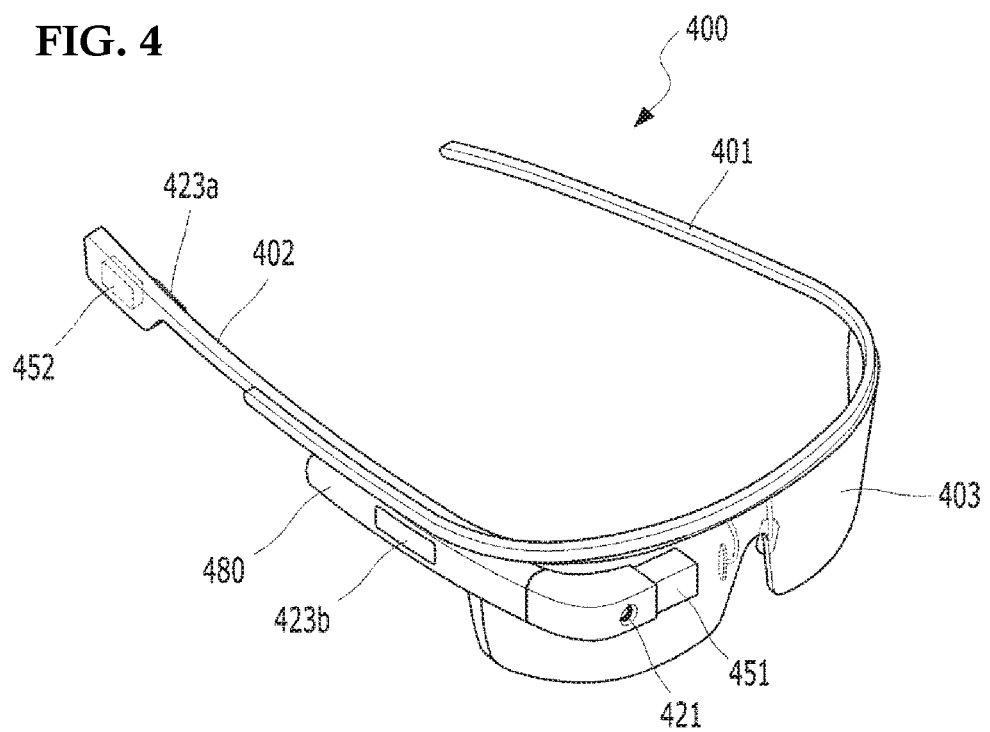
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

The mobile terminal mentioned earlier in the previous drawings can be applied to a mobile device to be described in the following drawings. Those skilled in the art can implement a different embodiment by changing a partial module of the mobile device. The change also belongs to the scope of the present invention.

Figure 5:
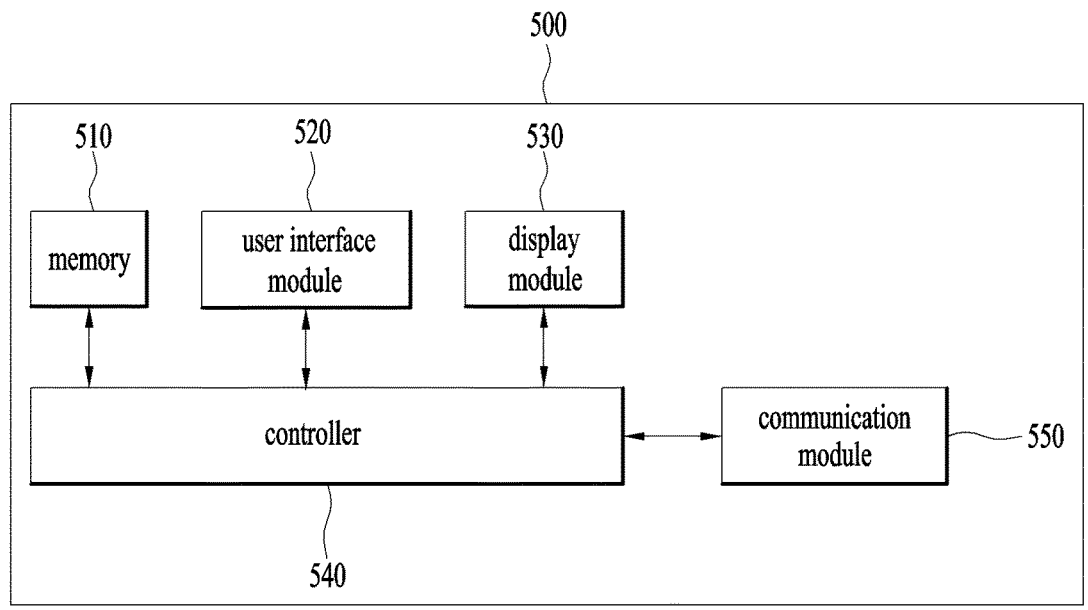
FIG. 5 is a block diagram for configuration elements of a mobile device according to one embodiment of the present invention.

FIG. 5 is a block diagram for configuration elements of a mobile device according to one embodiment of the present invention. As shown in FIG. 5, a mobile device 500 according to one embodiment of the present invention can include a memory 510, a user interface module 520, a display module 530, a controller 540, and a communication module 550.

For example, the memory 510 stores a first application and a second application and the user interface module 520 receives specific time information and specific location information according to the first application stored in the memory 510. The aforementioned applications can be stored in the memory 510 at the time of manufacturing the mobile device 500 or can be designed to be downloaded or deleted according to the necessity of a user. This also belongs to the scope of the present invention.

The display module 530 displays a schedule including the received specific time information and the specific location information and the controller 540 controls at least one selected from the group consisting of the memory 510, the user interface module 520, the display module 530, and the communication module 550.

The controller 540 executes the second application stored in the memory 510, receives additional information on the specific location according to the executed second application, and controls the schedule to be changed based on the received additional information.

For example, the first application corresponds to an application for controlling a calendar. For example, the second application corresponds to software performing an IA (intelligent agent) function. Regarding the IA, it shall be explained in detail later with reference to FIG. 6. Meanwhile, the first application corresponding to the application for controlling a calendar may correspond to either a calendar currently opened to the public or a random application related to a schedule.

Meanwhile, the second application is automatically executed at T1 timing and the T1 timing is designed to be changed according to the specific time information included in the schedule. Regarding this, it shall be explained in detail with reference to FIGS. 13 and 14 later. Or, the T1 timing may correspond to timing belonging to a predetermined range from the specific time included in the schedule and timing appearing after timing at which the mobile device is connected with a communication interface module installed in a vehicle. And, the T1 timing is designed to be changed according to a type of the vehicle. For example, if the vehicle is paired with the mobile device using a Bluetooth ID previously registered by a user of the mobile device, the T1 timing is designed to be relatively closer to specific time registered as a schedule.

Regarding this, it shall be explained in more detail with reference to FIG. 20 later.

If business hours corresponding to the specific location information are checked via the internet or a database, the controller 540 compares the checked business hours with the specific time information and changes the specific time information included in the schedule according to a result of the comparison. Regarding this, it shall be explained in more detail with reference to FIG. 10 later.

If the business hours corresponding to the specific location information are not checked via the internet or the database, the controller 540 is designed to transmit a call signal using a telephone number corresponding to the specific location information. Moreover, the controller 540 is designed to determine whether or not the specific location is opened according to whether or not the call signal is received. Regarding this, it shall be explained in more detail with reference to FIG. 11 later.

The controller 540 generates a voice message for an ARS (automatic response service) based on the specific time information and the specific location information included in the schedule and determines whether or not the specific location is opened according to a response for the voice message. Regarding this, it shall be explained in more detail with reference to FIG. 12 later.

When a phone call application is automatically executed in the background, if a touch input for selecting the phone call application is sensed, the controller 540 terminates the phone call application executed in the background. Of course, if a phone call application executed by an IA is not executed in the background, an operation of the controller is not necessary. However, when the phone call application is executed in the background by the IA, if a user intends to use a phone call application again, a conflict problem occurs. In order to solve the problem, when the phone call application is executed in the background by the IA, if a touch input for selecting the phone call application is sensed, it may temporarily stop using the phone call application executed in the background by the IA and resume the phone call application executed by the IA after an operation of the phone call application executed by the user ends. By doing so, it may be able to solve the aforementioned problem.

The controller 540 is designed to restrictively transmit updated information to e-mail of a specific person or a mobile device whenever update for the schedule occurs. For example, if no change occurs on a specific location while a schedule for specific time is changed, it is not necessary to retransmit information on the specific location. In this case, it may transmit a schedule update item for the specific time to a different device (e.g., included in the schedule) only. By doing so, it is able to have a technical effect capable of preventing a loss due to unnecessary data transmission.

Figure 6:
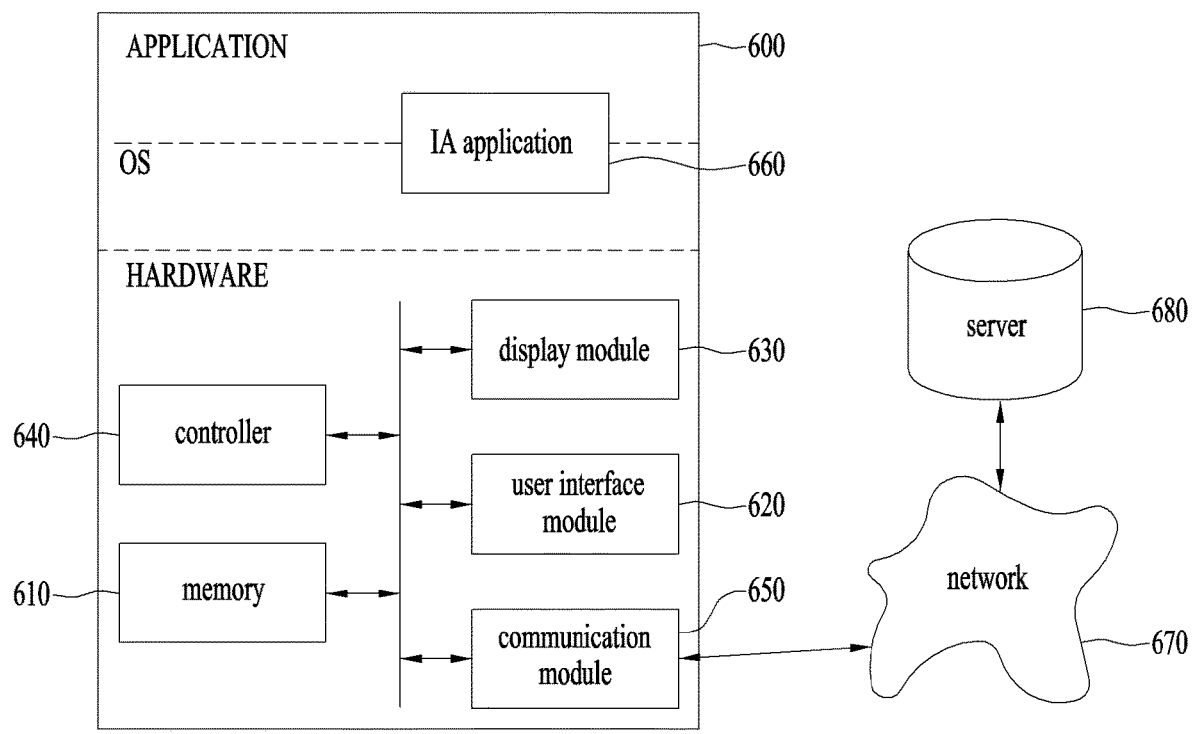
FIG. 6 is a diagram illustrating a system that a mobile device is equipped with an IA application according to one embodiment of the present invention.

FIG. 6 is a diagram illustrating a system that a mobile device is equipped with an IA application according to one embodiment of the present invention.

Referring to FIG. 6, similar to FIG. 5, a mobile device 600 includes a memory 610, a user interface module 620, a display module 630, a controller 640, and a communication module 650. Yet, unlike FIG. 5, the mobile device 600 accesses a server 680 (e.g., DB) via a network 670 (e.g., Internet) using the communication module 650. In this case, an IA application is necessary to receive additional information from an external database. In particular, unlike FIG. 5, the mobile device 600 shown in FIG. 6 further includes the IA application 660 and the IA application 660 can be included in an OS (operating system) layer or an application layer of the mobile device 600. In particular, the IA application may correspond to embedded software embedded in an OS of the mobile device 600 or downloadable software included in the application layer.

The IA or the IA application described in the present specification mainly plays a role of automatically controlling a calendar-related application or a schedule-related application, by which the present invention may be non-limited. For example, the IA or the IA application may correspond to a random software or hardware that performs a work instead of a user for a specific purpose. In particular, the present specification defines a trigger for initiating an operation of the IA or the IA application in detail to prevent the IA or the IA application from being unnecessarily operated. Hence, it may have a technical effect capable of improving efficiency and reducing unnecessary battery consumption. Regarding this, it shall be explained in detail with reference to FIGS. 13, 14, and 20.

Figure 7:
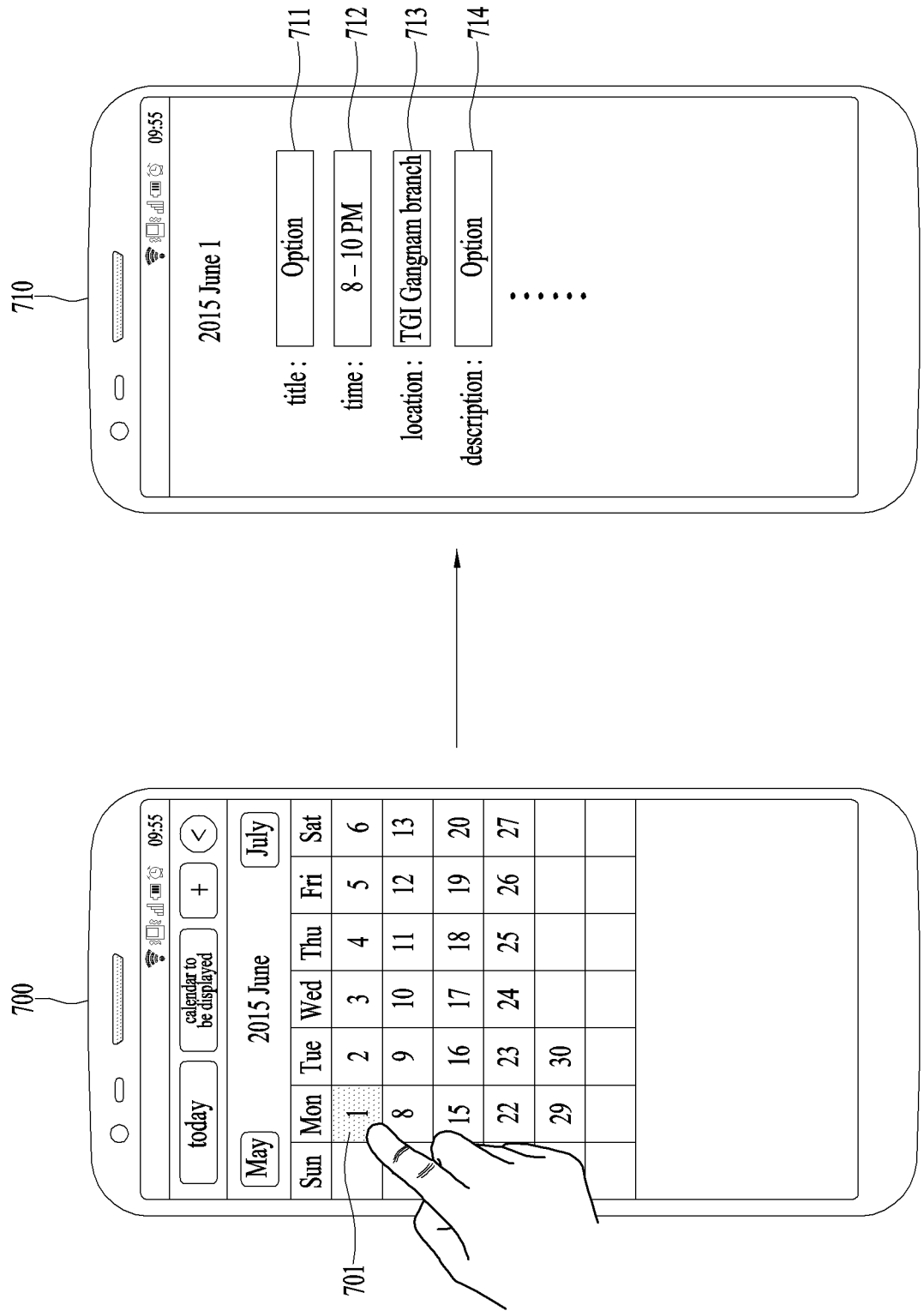
FIG. 7 illustrates a process of receiving basic information in a mobile device according to one embodiment of the present invention.

FIG. 7 illustrates a process of receiving basic information in a mobile device according to one embodiment of the present invention.

As mentioned in the foregoing description, a mobile device according to a legacy technology has a problem. In particular, although the mobile device receives random information from a schedule-related calendar application, the mobile device is unable to provide a function of automatically updating schedule-related information in accordance with a need of a user or a function of automatically checking whether or not it is able to reserve a specific location.

In order to solve the problem, as shown in FIG. 7, a mobile device 700 according to one embodiment of the present invention executes a calendar application and selects a specific date 701. As mentioned in the foregoing description, the calendar application can be embedded in the mobile device at the time of manufacturing the mobile device 700 or can be downloaded in a memory. The present invention can be applied to both cases.

Subsequently, after the specific date 701 is selected, the mobile device 700 receives at least one selected from the group consisting of a title 711, time 712, a specific location 713, and description 714 corresponding to the specific date. For example, the present invention assumes a case of receiving specific time information and specific location information as basic information, by which the present invention may be non-limited.

According to the related art, the mobile device plays a role of storing the information received from a user in a memory only. Yet, according to the embodiments of the present invention, the mobile device automatically executes an IA application based on basic information (e.g., specific time information and specific location information) received from a user and is designed to automatically control at least one of the internet and a phone call application.

Figure 8:
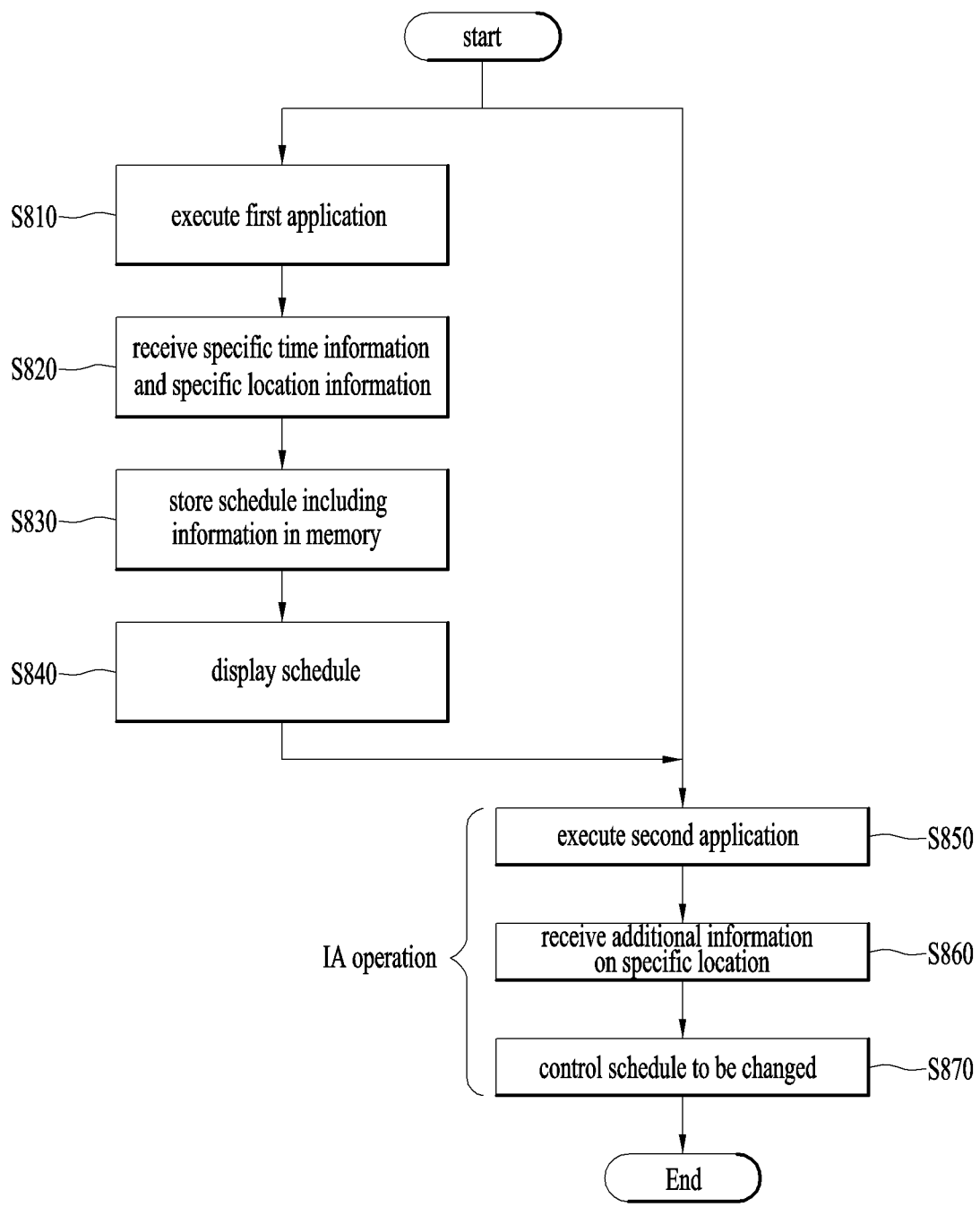
FIG. 8 is a flowchart for a method of controlling a mobile device according to one embodiment of the present invention.

FIG. 8 is a flowchart for a method of controlling a mobile device according to one embodiment of the present invention. Of course, although FIG. 8 describes operations of a mobile device in chronological order, those skilled in the art can delete or change a part of the steps and it may be able to complementarily interpret FIG. 8 with reference to FIGS. 5 to 7.

As shown in FIG. 8, a mobile device according to one embodiment of the present invention executes a first application stored in a memory [S810]. The first application, as mentioned in the foregoing description, may correspond to a random application related to a schedule or a calendar. The mobile device receives specific time information and specific location information according to the executed first application [S820]. In relation to the step S820, it has been explained in detail in FIG. 7.

Meanwhile, in the step S820 of FIG. 8, although it is assumed that the user of the mobile device directly inputs the specific time information and the specific location information, by which the present invention may be non-limited. For example, it may be able to receive information stored in an internal database of the mobile device or an external data base, information inputted by a user of a different mobile device via a calendar application, and information inputted via an interlocked PC. Those examples also belong to the scope of the present invention.

The mobile device stores a schedule including the received specific time information and the specific location information in the memory [S830] and displays the schedule [S840].

Subsequently, the mobile device executes a second application stored in the memory [S850]. The second application corresponds to software or a hardware performing an IA function. A trigger for initiating the second application is technically important. Regarding the trigger, it shall be explained in detail later with reference to FIGS. 13, 14, and 20.

The mobile device receives additional information on the specific location according to the executed second application [S860] and controls the schedule to be changed based on the received additional information [S870]. In particular, the steps S850, S860, and the S870 operate via an IA and the IA is designed to be executed in the background or the foreground. Both cases belong to the scope of the present invention.

In particular, the second application operating in the background or the foreground, i.e., an operating order of the IA (intelligent agent) is explained in detail with reference to FIG. 9 described in the following.

Figure 9:
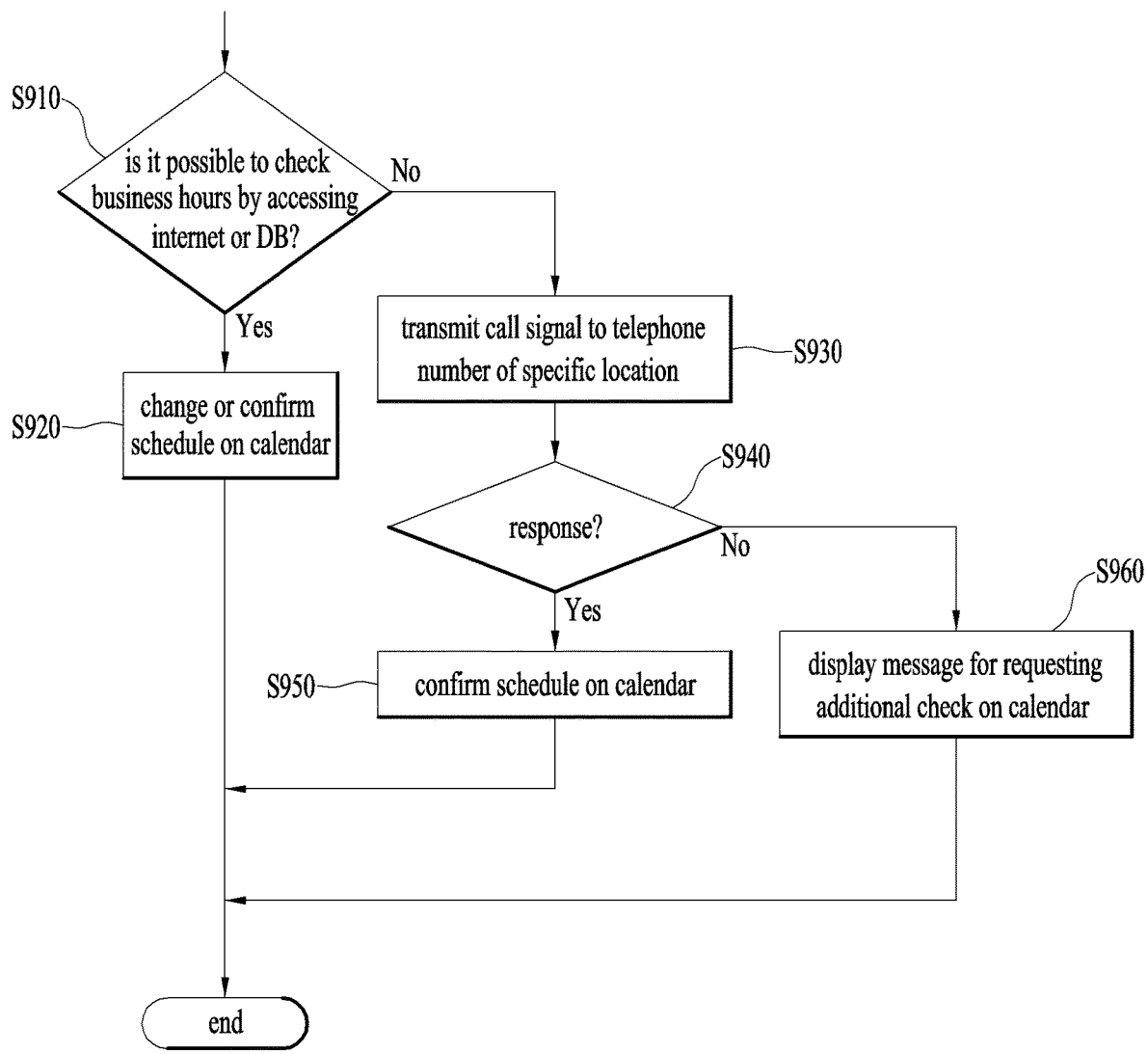
FIG. 9 is a flowchart illustrating an operation of an IA shown in FIG. 8 in more detail.

FIG. 9 is a flowchart illustrating an operation of an IA shown in FIG. 8 in more detail.

First of all, as shown in FIG. 7, assume that a mobile device receives specific time information and specific location information (via a calendar application). In this case, for example, assume that a specific location corresponds to a random store (e.g., coffee shop, restaurant, bar, etc.). Of course, determining the specific location using a GPS also belongs to the scope of the present invention. In this case, an IA corresponding to a second application stored in a memory of the mobile device operates and the IA determines whether or not it is able to check business hours of the specific location by accessing the internet or a database (an internal or external data base of the mobile device) [S910].

Based on a result of the determination [S910], if it is able to check the business hours of the specific location, i.e., if information on the business hours of the specific location is open to the internet, the IA compares the information with the specific time information inputted by a user and automatically change or confirm a specific schedule inputted by the user in a calendar application [S920].

Of course, as a method of changing the schedule, it may consider various embodiments described in the following.

First of all, if a difference between the time inputted by a user and the business hours of the specific location checked by the IA is less than a first range (less than 10 minutes), the IA automatically reflects a changed schedule without receiving a confirmation from the user.

Secondly, if the difference between the time inputted by the user and the business hours of the specific location checked by the IA is greater than a second range (more than 10 minutes), the IA is designed to determine whether to adjust a schedule after receiving a confirmation from the user.

Thirdly, unlike the first and second embodiments, if the time inputted by the user is different from the business hours of the specific location checked by the IA, the IA is designed to mandatorily receive a confirmation form the user irrespective of a difference between the time inputted by the user and the business hours of the specific location checked by the IA. This embodiment also belongs to the scope of the present invention.

Meanwhile, the aforementioned step S920 is explained in more detail with reference to FIG. 10 in the following.

On the contrary, based on a result of the determination [S910], if it is unable to check the business hours of the specific location, i.e., if information on the business hours of the specific location is not open although a telephone number of the specific location is obtainable from the internet, the IA transmits a call signal to the telephone number of the specific location [S930]. Of course, even when the telephone number of the specific location is already stored in the memory of the mobile device, the present invention can be applied as well. And, the step S930 includes both a case of executing a phone call application in the background and a case of executing the phone call application in the foreground.

After the call signal is transmitted to the telephone number of the specific location via the IA, the IA determines whether or not there is a response [S940]. Since it is able to apply the telephone number of the specific location not only to a smartphone but also to a general cellular phone (feature phone) or a general wire phone, compatibility of the present invention is high.

Based on a result of the determination [S940], if there is a response, the IA confirms a schedule selected by the user in a calendar application [S950]. In the aspect of the user, it is advantageous that an additional action is not required.

On the other hand, based on the result of the determination [S940], if there is no response, the IA estimates a business store of a specific location currently not existed. Yet, in order to more improve accuracy, the IA displays a message for requesting additional confirmation on a specific schedule of the calendar application [S960].

Meanwhile, regarding the steps S930, S940, S950, and S960, it shall be explained in more detail with reference to FIG. 11.

Figure 10:
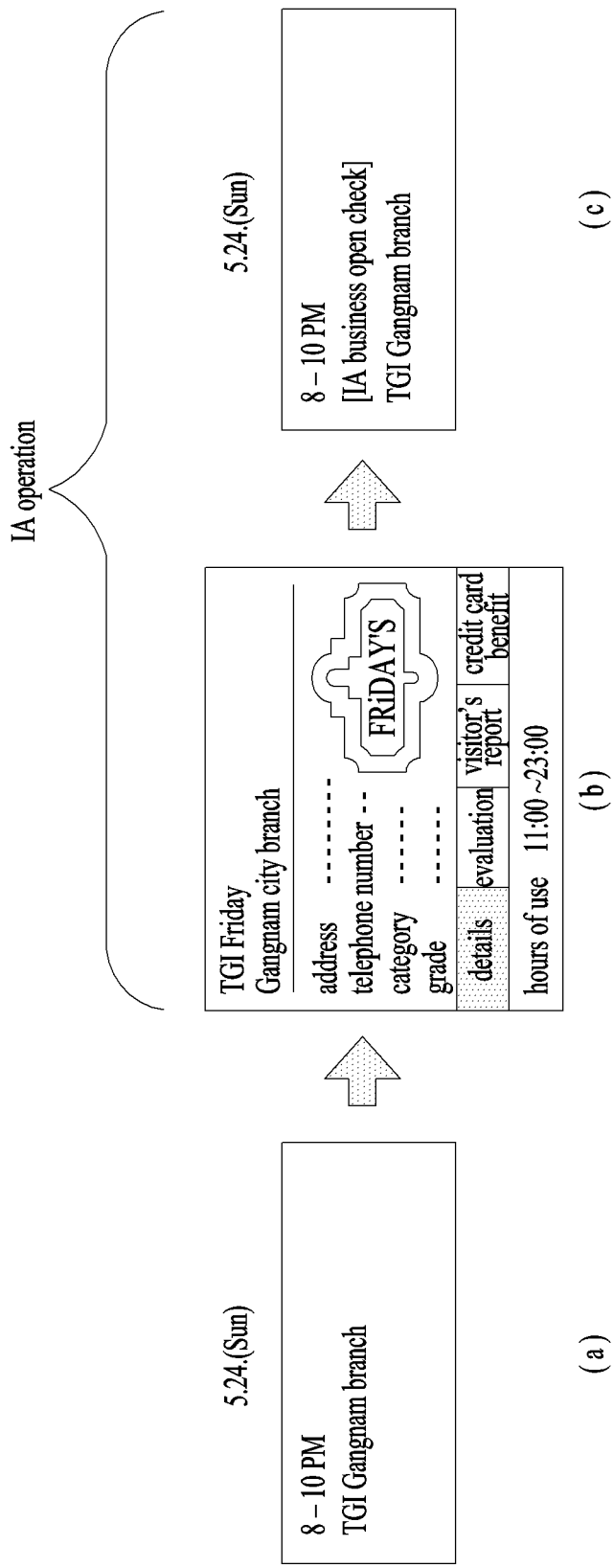
FIG. 10 is a diagram illustrating a first process of automatically checking whether or not a specific place is open according to a different embodiment of the present invention.

FIG. 10 is a diagram illustrating a first process of automatically checking whether or not a specific place is open according to a different embodiment of the present invention. The step S920 mentioned earlier in FIG. 9 is explained in more detail in FIG. 10. Of course, the IA is designed to execute at least one or more steps shown in FIG. 10 in the background or foreground.

As shown in FIG. 10(a), assume that specific time information and specific location information are received in a calendar application. In this case, as shown in FIG. 10(b), an IA automatically executes web surfing based on "TGI Gangnam branch" inputted as a specific location and obtains additional information on the "TGI Gangnam branch". For example, if the specific time information inputted by a user (FIG. 10(a)) is included in information on business hours (FIG. 10(b)) checked by the IA, as shown in FIG. 10(c), it may be able to design such a message as "IA business hour check" to be additionally displayed on a corresponding schedule in the calendar application.

In particular, if a user simply inputs specific location information in the calendar application, it may have a technical effect that it is not necessary for the user to manually check whether or not it is able to reserve the specific location one by one.

Of course, although the IA executes web surfing or accesses an internal or external database, the IA may fails to obtain information on business hours of a store located at a specific location or additional information on the store located at the specific location. A solution for the problem is explained in more detail with reference to FIG. 11 in the following.

Figure 11:
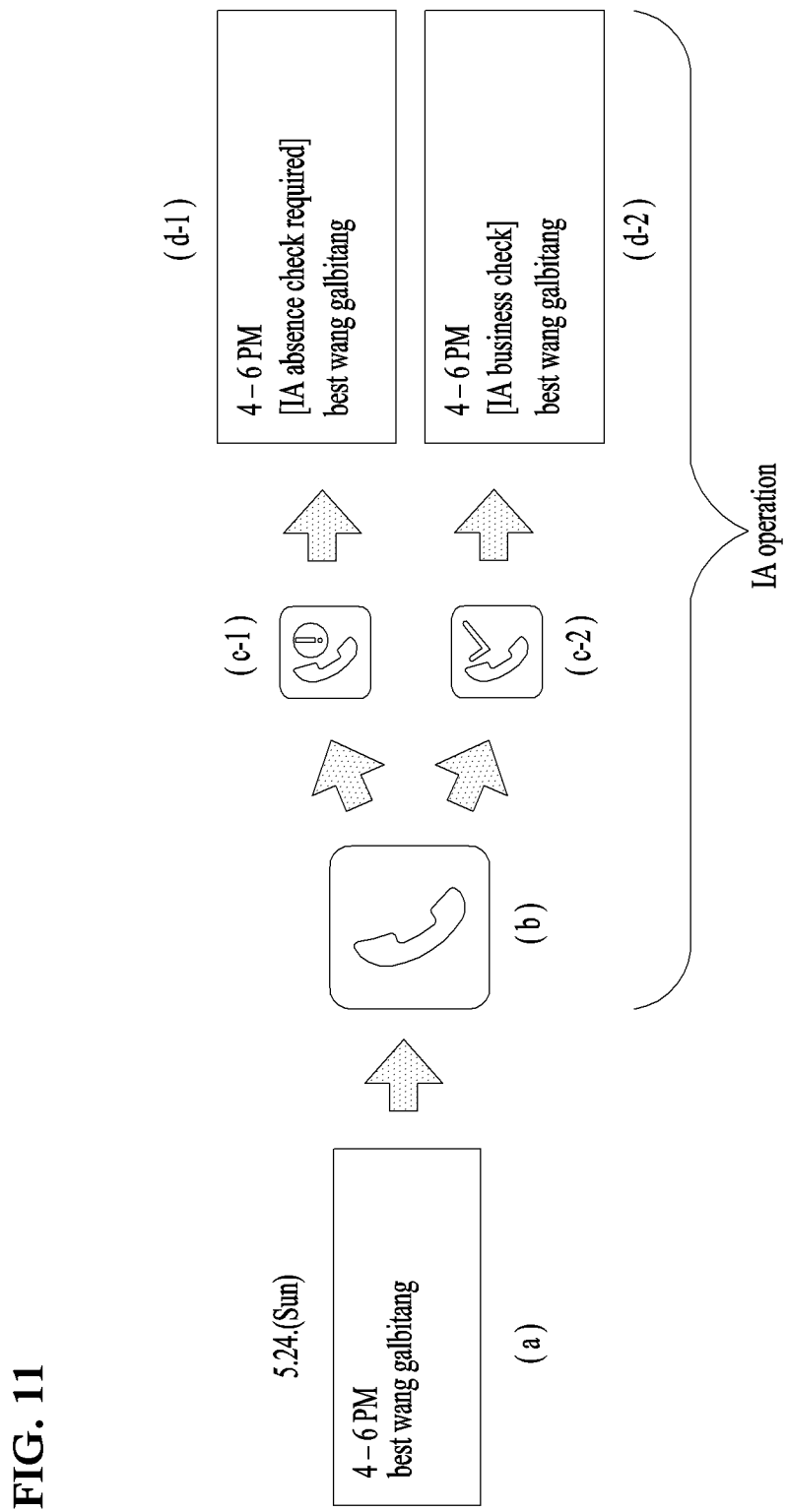
FIG. 11 is a diagram illustrating a second process of automatically checking whether or not a specific place is open according to a different embodiment of the present invention.

FIG. 11 is a diagram illustrating a second process of automatically checking whether or not a specific place is open according to a different embodiment of the present invention. The steps S930 to S960 mentioned earlier in FIG. 9 are explained in more detail in FIG. 11. Of course, the IA is designed to execute at least one or more steps shown in FIG. 11 in the background or foreground.

As shown in FIG. 11(a), assume that specific time information and specific location information are received in a calendar application. FIG. 11(a) illustrates a case that a general restaurant (e.g., best wang galbitang) is inputted. In this case, the general restaurant is relatively less well-known compared to the store shown FIG. 10(a) and it is difficult to obtain additional information on the general restaurant on the internet and a database. Of course, in this case, assume that the IA attempts to obtain additional information or business hour information on the "best wang galbitang" via web surfing and data base access, fails to obtain the information, and simply obtains a telephone number only.

As shown in FIG. 17(b), the IA of the mobile device automatically executes a phone call application in the background or foreground and transmits a call signal to the telephone number of the "best wang galbitang".

In this case, it may consider two cases.

As a first case, as shown in FIG. 11(c-1), if there is no response (e.g., answering a phone) in response to the call signal, as shown in FIG. 11(d-1), it may be able to design such a message as "IA absence check required" to be displayed on a corresponding schedule on a calendar.

As a second case, as shown in FIG. 11(c-2), if there is a response (e.g., answering a phone) in response to the call signal, as shown in FIG. 11(d-2), it may be able to design such a message as "IA business check" to be displayed on a corresponding schedule on a calendar. By doing so, although a user does not make a call to a business branch, the user can automatically check whether or not the business branch located at a specific location is open on the calendar.

According to the embodiment described in FIG. 11, a user determines whether or not a specific location is open simply based on whether or not the other party answers the phone.

Hence, it may have a little error and it is difficult to check a detail schedule. A technical solution for solving the problem above is explained in detail with reference to FIG. 12 in the following.

Figure 12:
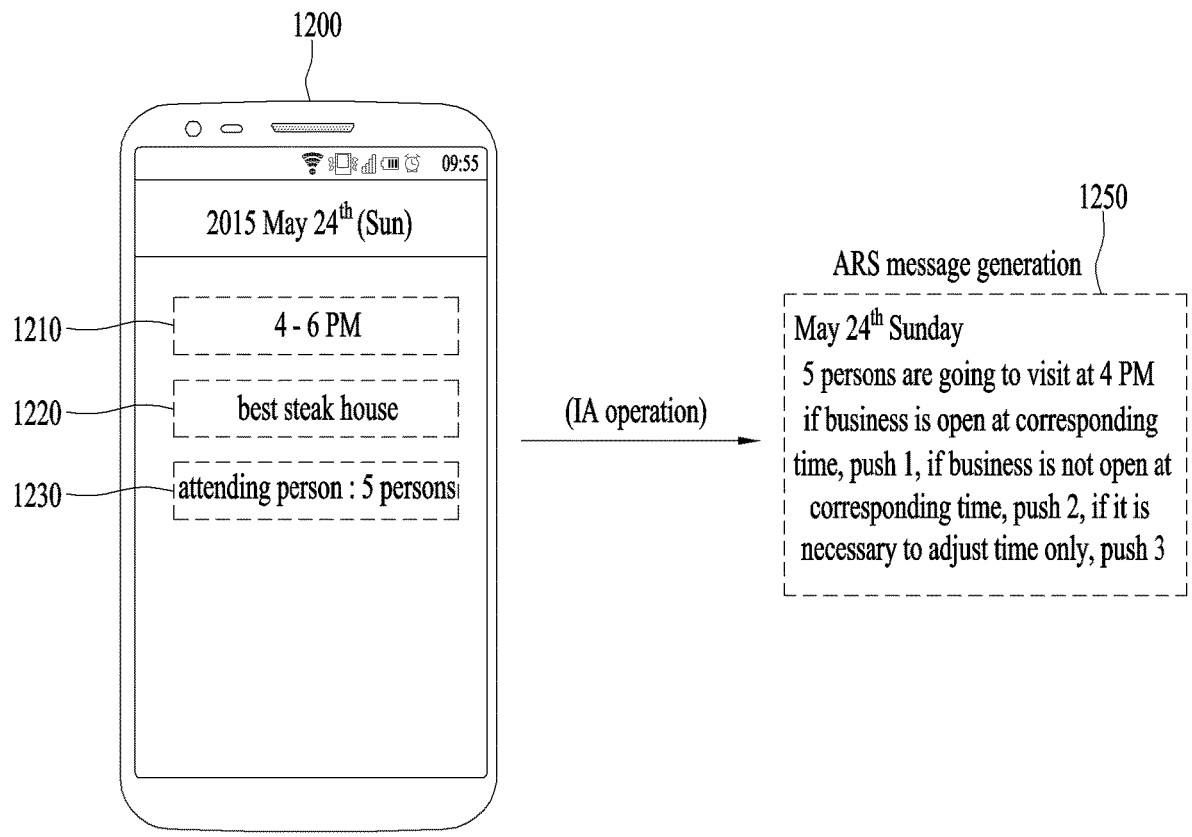
FIG. 12 illustrates an example of automatically generating an ARS message necessary for implementing a second process shown in FIG. 11.

FIG. 12 illustrates an example of automatically generating an ARS message necessary for implementing a second process shown in FIG. 11.

As shown in FIG. 12, assume that specific time information 1210, specific location information 120, and attending person information 1230 are inputted on a calendar application. Of course, the attending person information 1230 is optional. It is apparent that deleting the attending person information also belongs to the scope of the present invention.

If the information of the 3 types are received on the calendar application, an IA of a mobile device according to the embodiment of the present invention automatically operates and generates an ARS message 1250 based on the information of the 3 types.

As shown in FIG. 12, the ARS message 1250 includes the specific time information 1210, the attending person information 1230, and a message including at least one or more options provided to the other party (e.g., an owner of a business branch located at a specific location).

For example, the message including the at least one or more options may include "if business is open at corresponding time, push 1", "if business is not open, push 2", or "if time adjustment is necessary only, push 3". The message can be designed to be changed according to the necessity of those skilled in the art.

If the ARS message 1250 is generated, the IA transmits a call signal to a telephone number corresponding to a specific location 1220 obtained by the IA and additionally displays a result on the calendar application according to a response (e.g., a response selected from among the options 1, 2 and 3) or display the result using a separate scheme (e.g., pop-up message). This also belong to the scope of the present invention. Of course, a user can directly set a method of displaying a feedback result.

Meanwhile, as mentioned in the foregoing description, one of the technical characteristics of the present invention is to determine timing of automatically operating an IA, i.e., to efficiently determine a trigger. Regarding this, it shall be explained in detail with reference to FIGS. 13 and 14.

Figure 13:
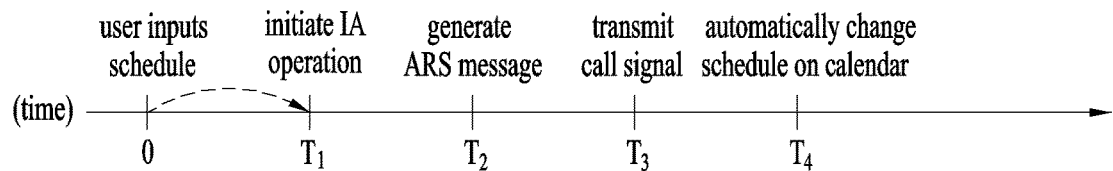
FIG. 13 illustrates an example of a timeline for determining timing at which an IA operates.

FIG. 13 illustrates an example of a timeline for determining timing at which an IA operates.

As shown in FIG. 13, assume that timing at which a schedule is inputted on a calendar application corresponds to "0". In this case, an IA is designed to operate at T1 timing, an ARS message is generates at T2 timing, and a call signal is transmitted to a phone corresponding to a specific location at T3 timing irrespective of specific time information inputted as a schedule. Yet, the T3 timing at which the call signal is transmitted is designed to appear prior to the specific time information. Lastly, whether to change a schedule on the calendar is determined according to whether or not there is a response in response to the call signal or response contents.

In particular, if a timeline is designed like as shown in FIG. 13, it may be able to prevent an IA from operating at unnecessary timing and it is able to determine whether or not it is able to reserve a specific location as soon as possible.

Figure 14:
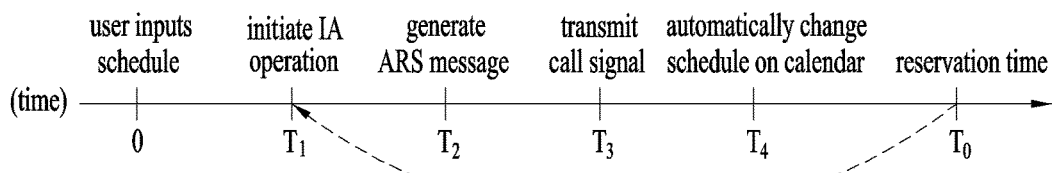
FIG. 14 illustrates a different example of a timeline for determining timing at which an IA operates.

FIG. 14 illustrates a different example of a timeline for determining timing at which an IA operates.

Unlike FIG. 13, FIG. 14 illustrates a characteristic that timing at which an IA is triggered is dependent on specific time information (i.e., reservation time information). This is because, although a user inputs or stores a specific schedule in a calendar, the user can cancel or change the schedule. In particular, if the schedule itself is canceled or changed, it is not necessary for the IA to operate in advance.

As shown in FIG. 14, assume that timing at which a schedule is inputted on a calendar application corresponds to "0". In this case, an IA is designed to operate at T1 timing pushed backward as much as predetermined time from specific time information (T0) inputted as a schedule, an ARS message is generates at T2 timing, and a call signal is transmitted to a phone corresponding to a specific location at T3 timing. Yet, the T3 timing at which the call signal is transmitted is designed to appear prior to the specific time information. Lastly, whether to change a schedule on the calendar is determined according to whether or not there is a response in response to the call signal or response contents.

For example, if a time difference between T0 and T1 is designed to be small as much as possible, although a schedule itself is cancelled or changed, it is able to prevent the IA from being unnecessary operated.

Moreover, it may be able to change the time difference between the T0 and the T1 according to a specific location inputted as a schedule and a location of a mobile device. This can also belong to the scope of the present invention.

For example, as a distance between a location (A) reserved as a specific location on a calendar and a current position (B) of a mobile device is getting longer, it may be able to design a time difference between T0 and T1 to be longer. On the other hand, as a distance between a location (A) reserved as a specific location on a calendar and a current position (B) of a mobile device is getting shorter, it may be able to design a time difference between T0 and T1 to be shorter.

Figure 15:
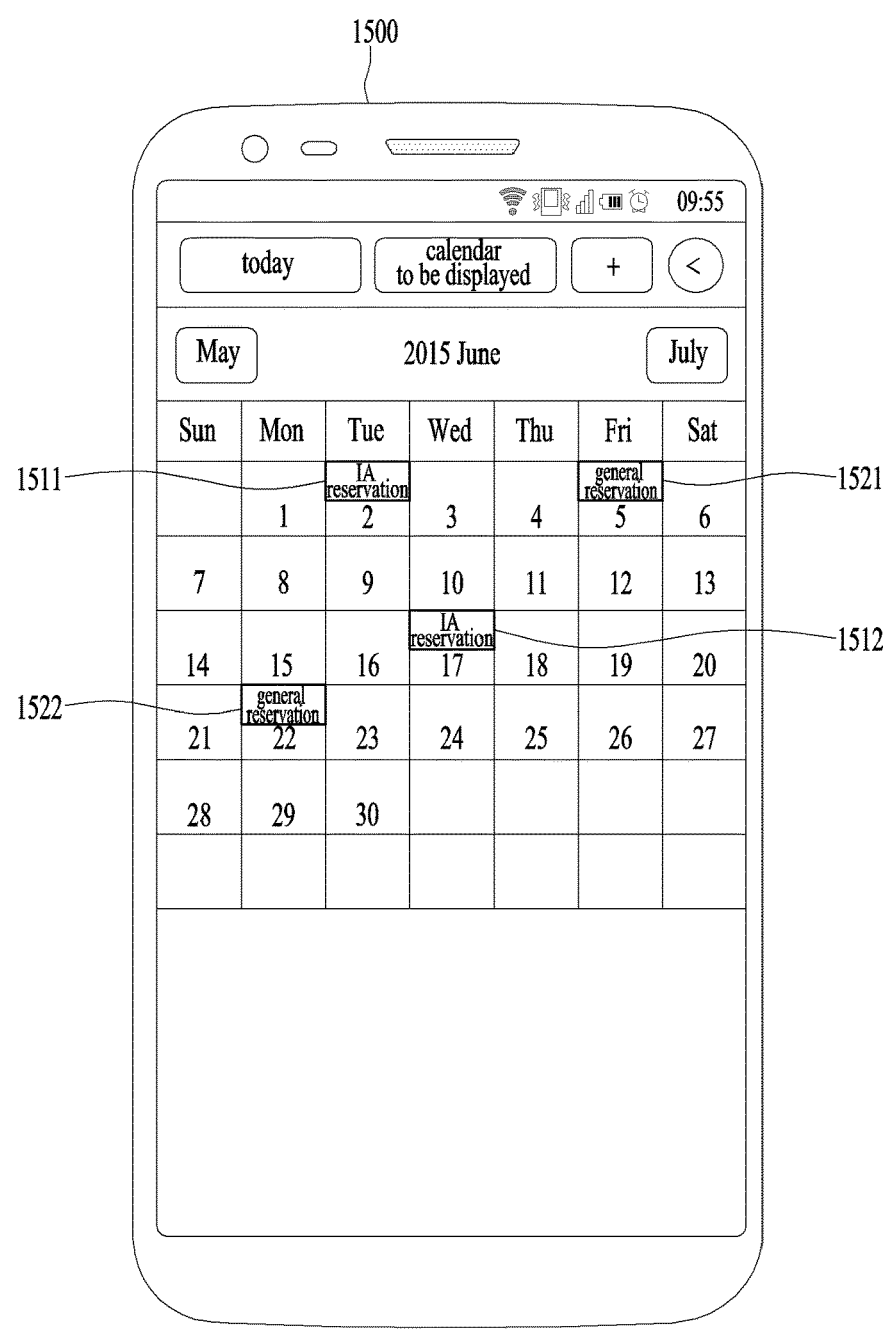
FIG. 15 is a diagram for a mobile device equipped with an IA that distinctively displays a general reservation and an AI reservation.

FIG. 15 is a diagram for a mobile device equipped with an IA that distinctively displays a general reservation and an AI reservation. A mobile device 1500 shown in FIG. 15 may correspond to a mobile device of a customer who has inputted a specific schedule on a calendar application or a mobile device of a business branch owner or a manager of a specific location.

As shown in FIG. 15, the mobile device 1500 according to the embodiment of the present invention distinctively displays a normal reservation 1521/1522 and an IA reservation 1511/1512 on the calendar application.

By doing so, a user can automatically distinguish a schedule to which an update is reflected from a manually inputted schedule and can finally check whether or not a schedule or a reservation changed by an operation of an IA application fits the intention of the user.

In the previous drawings, it was assumed that the IA application is mainly installed in a mobile device of a customer only. Yet, in FIG. 16, assume that the IA application is installed in a mobile device of a business branch owner of a specific location or a mobile device of a manager.

Figure 16:
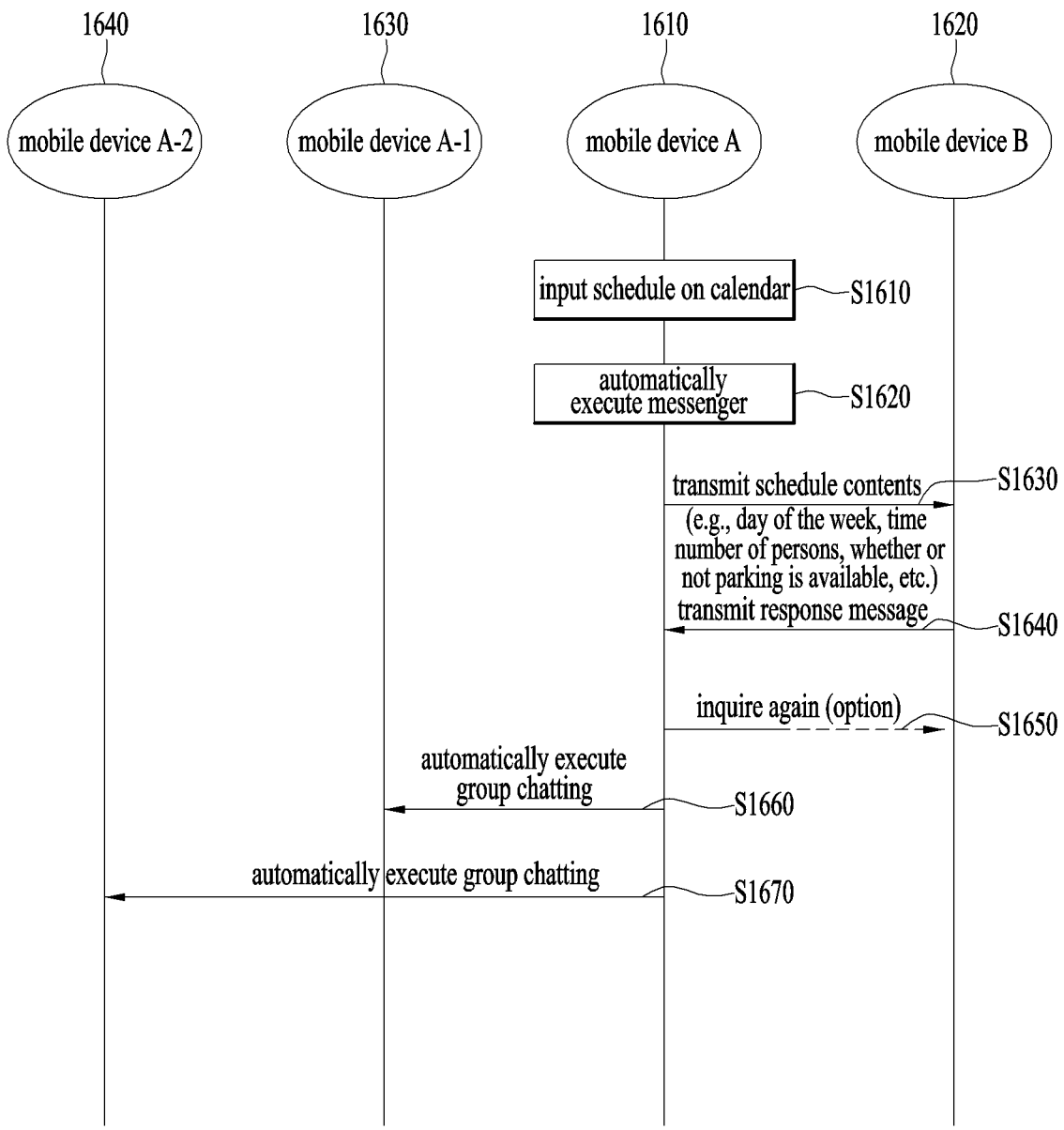
FIG. 16 is a flowchart for a procedure of automatically interlocking a calendar with a messenger according to a further different embodiment.

FIG. 16 is a flowchart for a procedure of automatically interlocking a calendar with a messenger according to a further different embodiment.

A mobile device A 1610 shown in FIG. 16 corresponds to a mobile device of a customer and a mobile device B 1620 corresponds to a mobile device of a business branch owner of a specific location or a mobile device of a manager. Moreover, in FIG. 16, assume that a mobile device A-1 1630 and a mobile device A-2 1640 correspond to cellular phone numbers stored in a memory of the mobile device A 1610 as persons attending a specific schedule on a calendar of the mobile device A.

First of all, the mobile device A 1610 executes a calendar application and inputs a specific schedule [S1610]. For example, assume that the specific schedule includes specific time information, specific location information, and information on attending persons (e.g., phone numbers of persons intending to attend the specific schedule).

Unlike the related art, if the specific schedule is inputted [S1610], an IA of the mobile device A 1610 is designed to automatically execute a messenger [S1620]. There is no restriction on the messenger. In particular, currently known messengers including a messenger for mobile use, a messenger for a PC and the like can be included in the messenger.

Meanwhile, the IA automatically searches for a conversation partner on the messenger using specific location information (e.g., TGI Gangnam branch). For example, the IA may use a telephone number of the specific location information or a name of the specific location information to search for a conversation partner.

If the IA searches for "TGI Gangnam branch" as a conversation partner using the specific location information, the IA transmits schedule contents to the mobile device B 1620 using the messenger [S1630]. For example, the schedule contents can include at least one selected from the group consisting of specific time information (e.g., a date, a day of the week, time, etc.) information on attending persons, and content for inquiring about whether or not parking is available.

Although an actual owner of the mobile device B 1620 or a manager is able to manually transmit a response message, the mobile device B 1620 equipped with the IA is designed to automatically transmit the response message [S1640].

Meanwhile, the response message included in the step S1640 can be mainly divided into 3 types.

As a first type, content completely denying a query message of the step S1630 can be included in the response message of the step S1640.

As a second type, content completely accepting a query message of the step S1630 can be included in the response message of the step S1640.

As a third type, content accepting a part of a query message of the step S1630 and denying a part of the query message (e.g., reservation is available, whereas parking is unavailable) can be included in the response message of the step S1640. In this case, the IA of the mobile device A 1610 transmits a message for inquiring again to the IA of the mobile device B 1620 via a random messenger [S1650]. Of course, it may be able to design the IA of the mobile device A to receive a final confirmation from a user before the message is transmitted.

If a schedule is determined via the aforementioned steps S1610 to S1650, the mobile device A-1 1630 and the mobile device A-2 1640 are invited to group chatting on a messenger using a telephone number of a participant included in the schedule, and the like [S1660, S1670].

Subsequently, the IA of the mobile device A 1610 transmits information on the finally confirmed schedule to the mobile device A-1 1630 and the mobile device A-2 1640.

Figure 17:
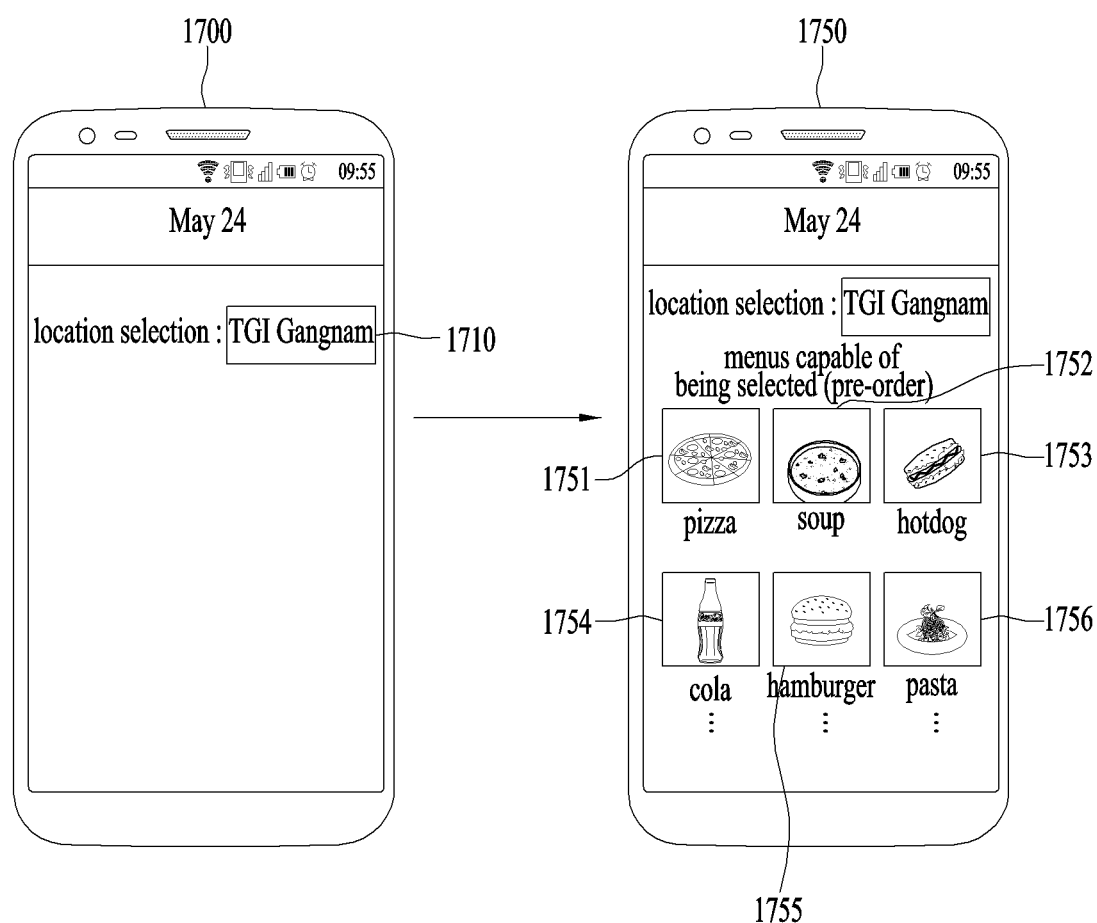
FIG. 17 illustrates an option for preordering a menu mapped to a specific place when a mobile device executes a calendar according to a further different embodiment.

FIG. 17 illustrates an option for preordering a menu mapped to a specific place when a mobile device executes a calendar according to a further different embodiment.

A mobile device according to the related art does not provide a user with a function capable of performing preorder on a calendar application.

On the other hand, as shown in FIG. 17, assume that a mobile device 1700 according to a further different embodiment of the present invention selects a specific date and a specific location 1710 on the calendar application.

In this case, an IA of a mobile device 1750 according to a further different embodiment of the present invention collects information on menus provided at the selected specific location 1710 via the internet or a database and displays menus 1751/1752/1753/1754/1755/1756 capable of being preordered only.

If a menu is selected from among the menus capable of being preordered, as mentioned earlier in FIG. 16, the IA of the mobile device 1750 is designed to automatically execute a messenger and perform conversation and preordering with an IA of a mobile device (owned by an owner or a manager) corresponding to a specific location. Hence, a user can selects not only a specific location but also a menu preferred by the user on a calendar application, thereby reducing unnecessary time-waste.

FIG. 18 is a diagram for explaining a method for a mobile device to manage a plurality of locations with a single ID by utilizing a database according to a further different embodiment.

When a user inputs a specific location on a calendar application, if the user manually inputs the specific location, the user may use a different name for the same location. Since the different name does not indicate a different business store, if the specific location is managed as a different business store, it is highly probable that an IA makes a mistake when the IA performs a recommendation service in the future. A solution for the problem is explained with reference to FIG. 18 in the following.

For example, assume that a user using a mobile device according to a further different embodiment of the present invention inputs "matgaltang" and "02-555-5555" on a calendar application on January $1^{st}$. And assume that the user inputs "matnangalbi" and "02-555-5555" on the calendar application on March $20^{th}$. And, assume that the user inputs "matgalbi" and "02-555-5555" on the calendar application on May $7^{th}$. Lastly, assume that the user inputs "galbitang" and "031-111-1111" on the calendar application on April $2^{nd}$.

In this case, an IA uses a telephone number as a unique ID of a specific location irrespective of similarity between names. In particular, as shown in FIG. 18, since matgaltang 1810, matnangalbi 1820, and matgalbi 1830 use the same telephone number, the names are managed by a single ID (i.e., ID #1) and galbitang 1840 is separately managed by a different ID (i.e., ID #2) because the galbitang 1840 uses a different telephone number.

Hence, the IA is able to easily check that the user has scheduled a specific location corresponding to ID #1 three times with reference to a data base shown in FIG. 18.

In the previous drawings, it was assumed that a user directly inputs a specific location on a calendar application. On the other hand, a solution for recommending a specific location optimized to a user to the user using a DB shown in FIG. 18 is explained in detail with reference to FIG. 19 in the following.

Figure 19:
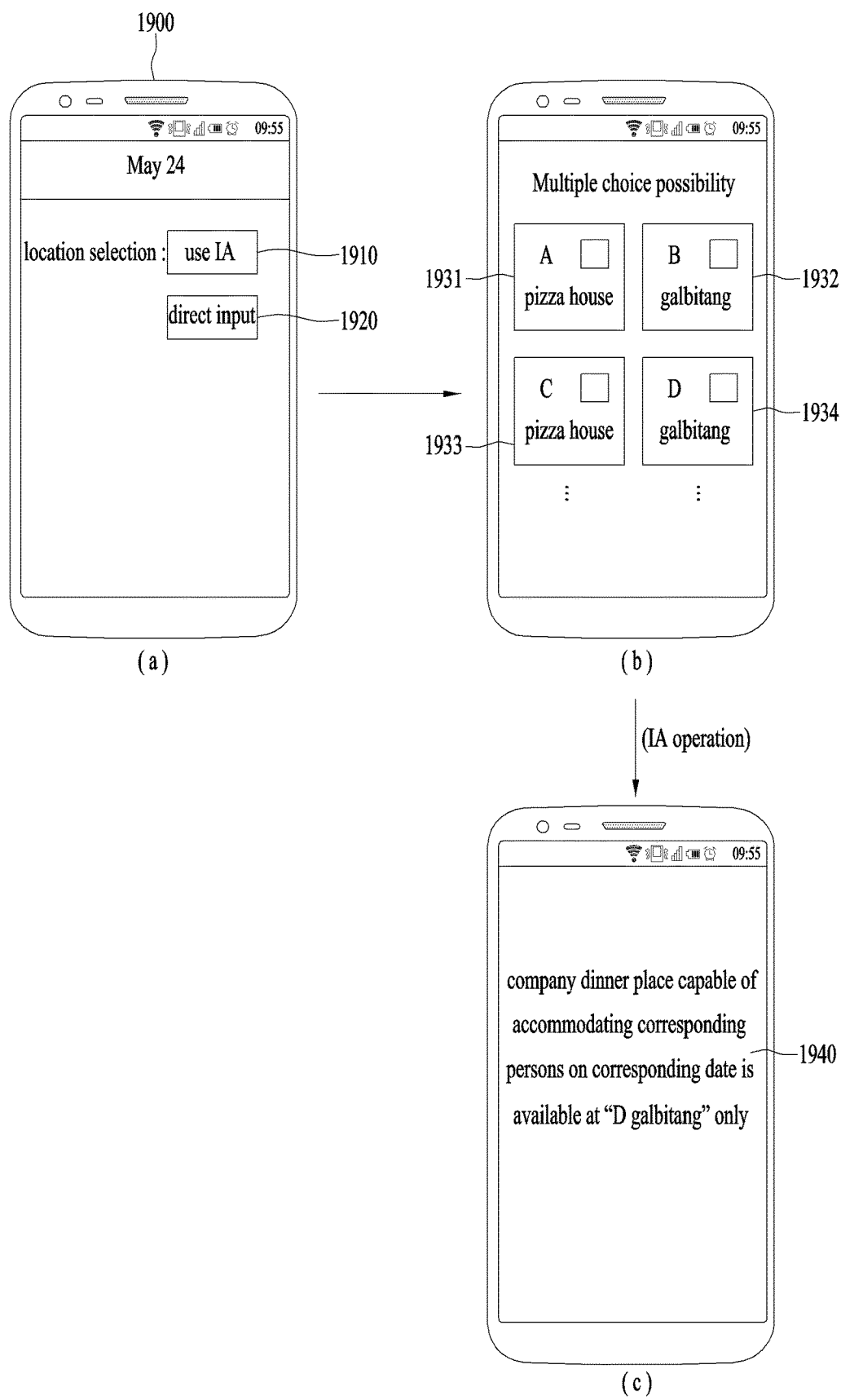
FIG. 19 is a diagram for explaining a technology of automatically recommending a specific location on a calendar by a mobile device according to a further different embodiment.

FIG. 19 is a diagram for explaining a technology of automatically recommending a specific location on a calendar by a mobile device according to a further different embodiment.

As shown in FIG. 19(a), a mobile device 1900 according to a further different embodiment of the present invention determines specific time (date, and the like) on a calendar application and provides two options for selecting a location. In particular, the mobile device provides a user with a first option 1910 for automatically recommending a location using an IA and a second option 1920 for enabling the user to directly input a location.

In FIG. 19(a), if the first option 1910 is selected, as shown in FIG. 19(b), options 1931/1932/1933/1934 capable of selecting a plurality of candidate locations are displayed. Of course, the IA may automatically recommend a location based on at least one of information on a frequently used location and information on a recently used specific location while FIG. 19(b) is omitted. This also belongs to the scope of the present invention.

For example, in FIG. 19(b), assume that A (pizza store) 1931, B (galbitang) 1932, C (pizza store) 1933, and D (galbitang) 1934 are all selected. In particular, a need of a user is to check a location capable of being reserved on May $24^{th}$ among the four locations. It is not necessary for the user to make a call to all of the locations.

As mentioned in the foregoing description, the IA may make a call to the four locations or check whether or not it is able to reserve the locations via a messenger. As shown in FIG. 19(c), the IA displays a message 1940 indicating that it is able to reserve the D (galbitang) only.

Meanwhile, although it is not depicted in FIG. 19, if a user simply selects a specific category (e.g., western restaurant, Chinese restaurant, hotel buffet) only without directly specifying a specific location, it may be able to design an IA to automatically search for specific locations (A Chinese restaurant, B Chinese restaurant, and C Chinese restaurant) included in a specific category. Moreover, the IA makes a call to each of the specific locations to check whether or not a reservation is available. A method of performing communication between IAs has already been explained in FIGS. 9 to 11. A finally confirmed reservation (e.g., May $2^{nd}$, 2:00 PM, A Chinese restaurant) is automatically reflected to a calendar or schedule-related application of a mobile device.

Moreover, if a plurality of restaurants of a specific category are available on a specific date/time determined by a user or a specific date/time recommended by the IA, it is necessary to have a solution for handling the abovementioned case. First of all, it may display information on a plurality of the restaurants searched by the IA and a user may directly select one from among a plurality of the restaurants.

And, automatically determining a priority based on information collected from a DB or the internet also belongs to the scope of the present invention. For example, as shown in Table 1 in the following, if there are a plurality of restaurants searched by the IA, the IA automatically determines a priority based on information on a distance (from a mobile device or a specific point). Or, as shown in Table 2 in the following, the IA determines a priority based on recommendation number information (or, star point information) on each of restaurants. Or, as shown in Table 3 in the following, the IA puts a weight α or β on each of the distance information and the recommendation number information and automatically determines a priority by summing up the information. This also belongs to the scope of the present invention.

Hence, it may expect a technical effect capable of solving a problem that a user selects a specific location again.

TABLE 1

| Priority | Distance |
|---|---|
| 1 | a |
| 2 | b |
| 3 | c |

TABLE 2

| Priority | Recommendation number |
|---|---|
| 1 | A |
| 2 | B |
| 3 | C |

TABLE 3

| Priority | Distance (weight) | Recommendation number (weight) |
|---|---|---|
| 1 | a * α | A * β |
| 2 | b * α | B * β |
| 3 | c * α | C * β |

In the following, assume that at least one or more persons are going to attend a specific schedule and at least one of the persons carries a mobile device equipped with an IA.

For example, an IA of a mobile device A, an IA of a mobile device B, and an IA of a mobile device C are designed to perform data communication with each other. The IA of the mobile device A preferentially operates to determine a schedule reservation for a specific location and transmits schedule reservation information to the IA of the mobile device B and the IA of the mobile device C. Then, a calendar-related application or a schedule-related application is automatically executed and determined schedule information is recorded.

By doing so, it may have a technical effect of not generating an unnecessary IA operation.

Figure 20:
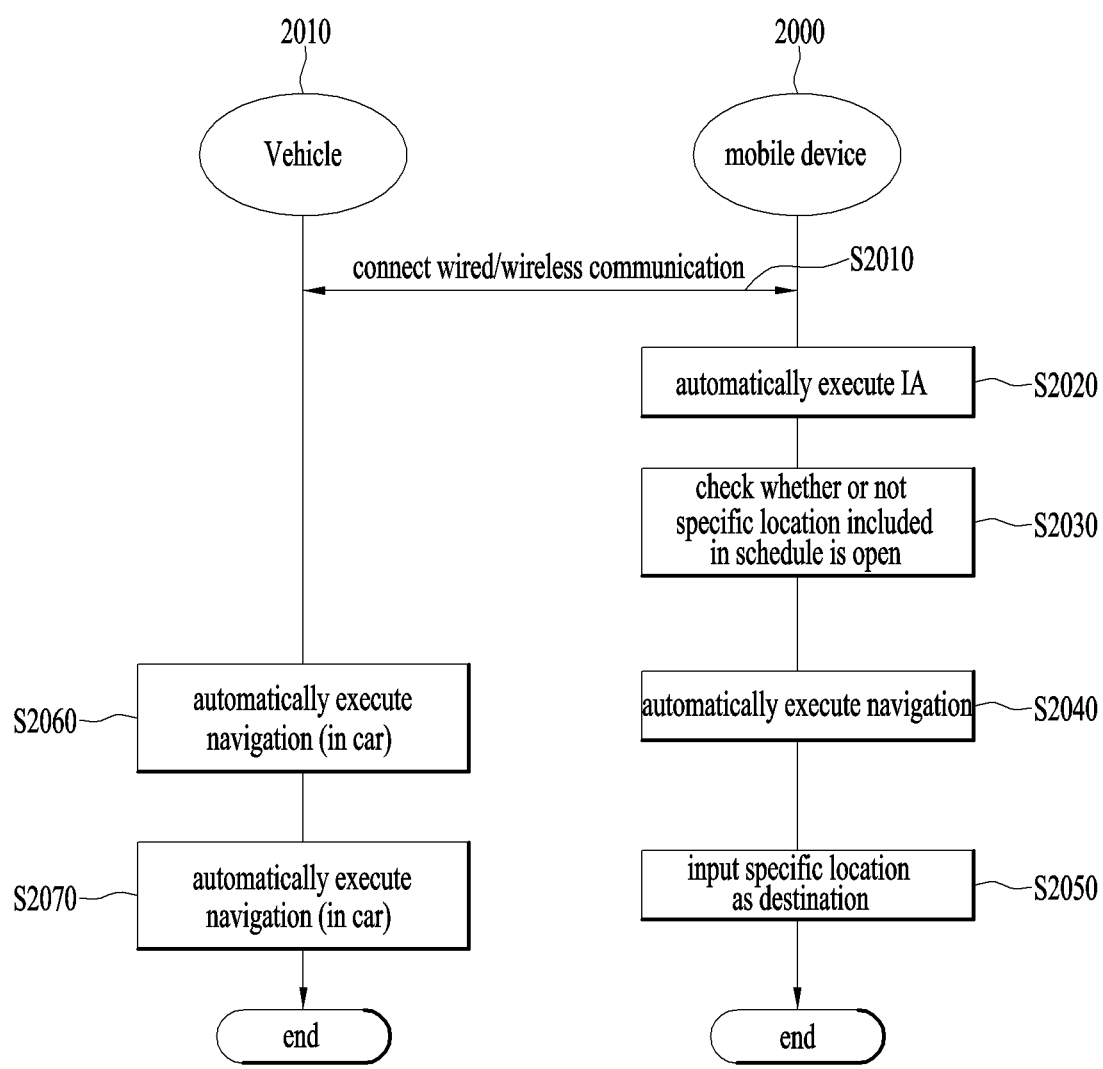
FIG. 20 is a flowchart for a process of interlocking a mobile device with a vehicle and determining a trigger of an IA according to a further different embodiment.

FIG. 20 is a flowchart for a process of interlocking a mobile device with a vehicle and determining a trigger of an IA according to a further different embodiment.

In the foregoing description, a method of determining a trigger or timing has been explained in detail with reference to FIGS. 13 and 14. In FIG. 20, an IA is designed to operate [S2020] only when a mobile device 2000 and a vehicle 2010 are connected wirelessly or in wired [S2010]. Of course, assume that the IA operates on the same date on the calendar application and the date is within prescribed time form reservation time. For example, additionally considering a distance between a mobile device and a specific location and traffic situation also belongs to the scope of the present invention.

The IA of the mobile device 2000 checks whether or not a specific location included in a specific schedule (including location information and time information) is open [S2030]. Regarding this, since it has been sufficiently explained in the previous drawings, overlapped explanation is omitted at this time.

If the specific location is open, the IA automatically executes a navigation of the mobile device 2000 [S2040] or transmits a command for starting a navigation of the connected vehicle [S2060].

Subsequently, the IA of the mobile device 2000 inputs specific location information of the calendar to the navigation of the mobile device as a destination [S2050] or transmits the specific location information to the navigation system of the connected vehicle [S2070].

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

The embodiments of the present invention have been explained in detail in the [BEST MODE].

INDUSTRIAL APPLICABILITY

As mentioned in the foregoing description, since the present invention is applicable to a mobile device of any type, the present invention is industrially applicable.

What is claimed is:

1. A method of controlling a mobile device, the method comprising:
   executing a first application stored in a memory of the mobile device;
   receiving specific time information and specific location information according to the executed first application;
   storing a schedule containing the received specific time information and the specific location information in the memory;
   displaying, on a display of the mobile device, the schedule; executing a second application stored in the memory;
   receiving additional information on the specific location according to the executed second application;
   when business hours corresponding to the specific location information are not checked via the internet or a database, transmitting, from the mobile device, a call signal to a telephone number corresponding to the specific location information;
   generating, from the mobile device, a voice message for an ARS (automatic response system) based on the specific time information and the specific location information contained in the schedule;
   determining, by the mobile device, whether or not, the specific location is open according to a response for the voice message;
   controlling the schedule to be changed based on the received additional information;
   displaying a first option and a second option, on the mobile device;
   in response to selecting the first option, displaying at least one option corresponding to one or more specific locations, on the mobile device; and
   in response to selecting one or more options corresponding to the one or more specific locations, displaying on the mobile device a result message indicating availability of at least one of the one or more specific locations,
   wherein the first application corresponds to an application for controlling a calendar, and wherein the second application corresponds to software performing an IA (intelligent agent) function and is executed in the background or foreground of the mobile device,
   wherein the second application is configured to make a call to each of the one more specific locations to check whether a reservation is available,
   wherein the second application is automatically executed on the mobile device at T1 timing and wherein the T1 timing varies according to the specific time information contained in the schedule, and
   wherein the TI timing corresponds to timing within a predetermined range from specific time contained in the schedule and the timing appearing after timing at which a communication interface module installed in the mobile device is connected to another mobile device.

2. The method of claim 1, wherein if business hours corresponding to the specific location information are checked via the internet or a database, the controlling step further comprises the steps of:
   comparing the checked business hours with the specific time information; and
   changing the specific time information contained in the schedule according to a result of the comparison.

3. The method of claim 1, further comprising the step of determining whether or not the specific location is open according to whether a response is received in response to the call signal.

4. The method of claim 1, when a phone call application is automatically executed in the background, if a touch input selecting the phone call application is sensed, further comprising the step of terminating the phone call application executed in the background.

5. The method of claim 1, whenever an update occurs on the schedule, further comprising the step of restrictively transmitting updated information to an e-mail or a mobile device of a specific person.

6. A mobile device, comprising:
   a memory configured to store a first application and a second application;
   a user interface module configured to receive specific time information and specific location information according to the first application stored in the memory;
   a display module configured to display a schedule containing the received specific time information and the specific location information; and
   a controller configured to control the memory, the user interface module, and the display module,
   wherein the controller is further configured to:
   execute a second application stored in the memory,
   receive additional information on the specific location according to the executed second application,
   when business hours corresponding to the specific location information are not checked via the internet or a database, transmit, a call signal to a telephone number corresponding to the specific location information,
   generate a voice message for an ARS (automatic response system) based on the specific time information and the specific location information contained in the schedule
   determine whether or not, the specific location is open according to a response for the voice message,
   control the schedule to be changed based on the received additional information,
   display a first option and a second option, on the mobile device,
   in response to selecting the first option, display, on the mobile device, at least one option corresponding to one or more specific locations, and
   in response to selecting one or more options corresponding to one or more specific locations, display a result message indicating availability of at least one of the one or more specific locations,
   wherein the first application corresponds to an application for controlling a calendar, wherein the second application corresponds to software performing an IA (intelligent agent) function and is executed in the background or foreground, wherein the second application is configured to make a call to each of the one or more specific locations to check whether a reservation is available, wherein the second application is automatically executed on the mobile device at T1 timing and wherein the T1 timing varies according to the specific time information contained in the schedule, and wherein the TI timing corresponds to timing within a predetermined range from specific time contained in the schedule and the timing appearing after timing at which a communication interface module installed in the mobile device is connected to another mobile device.

7. The mobile device of claim 6, wherein if business hours corresponding to the specific location information are checked via the internet or a database, the controller is configured to compare the checked business hours with the specific time information and change the specific time information contained in the schedule according to a result of the comparison.

8. The mobile device of claim 6, wherein the controller is configured to determine whether or not the specific location is open according to whether a response is received in response to the call signal.

9. The mobile device of claim 6, wherein when a phone call application is automatically executed in the background, if a touch input selecting the phone call application is sensed, the controller is configured to terminate the phone call application executed in the background.

10. The mobile device of claim 6, wherein whenever an update occurs on the schedule, the controller is configured to restrictively transmit updated information to an e-mail or a mobile device of a specific person.

* * * * *